Figure 1:
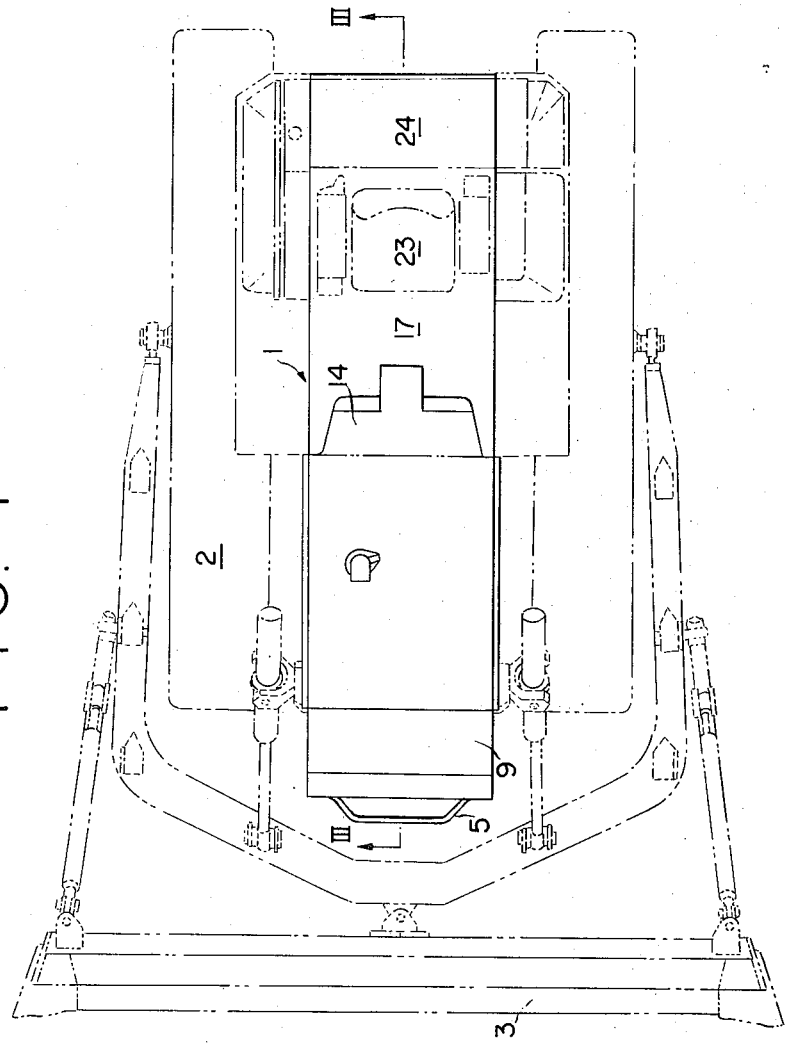

United States Patent [19]
Kawamura

[11] 3,812,927
[45] May 28, 1974

[54] ENDLESS TRACK TYPE TRACTOR
[75] Inventor: Ryohei Kawamura, Nomi-gun, Ishikawa-ken, Japan
[73] Assignee: Kabushiki Kaisha Komatsu Seisakusho, Tokyo, Japan
[22] Filed: Aug. 30, 1971
[21] Appl. No.: 175,865

[30] Foreign Application Priority Data
Aug. 29, 1970 Japan.............................. 45-75420

[52] U.S. Cl............................................. 180/54 A
[51] Int. Cl............................................. B60k 11/04
[58] Field of Search ........ 180/54 A, 69, 68 P, 68 R, 180/54 D, 54 F, 54 E, 9.24, 9.42, 9.2, 9; 181/33 K; 115/1

[56] References Cited
UNITED STATES PATENTS
1,738,523  12/1929  Campbell, Jr. et al......... 180/9.24 R
2,184,882  12/1939  Meyer ............................. 180/68 P
2,452,671  11/1948  Merrill .......................... 180/9.24 R
3,043,390  7/1962   Lattay............................. 180/54 A
3,185,243  5/1965   Burback........................... 180/54 A
3,319,732  5/1967   Soeteber et al.................. 180/54 A FOREIGN PATENTS OR APPLICATIONS
448,081  4/1948   Canada............................. 181/33 K
420,541  10/1925  Germany .......................... 180/54 D Primary Examiner—David Schonberg
Assistant Examiner—Milton L. Smith
Attorney, Agent, or Firm—Armstrong, Nikaido & Wegner

[57] ABSTRACT

An endless track type tractor which has a radiator mask projected forwardly at the central portion of one side edge of a rectangular plate to form a curved edge and having a central recessed portion continued from the curved edge, said mask being fixed to the front end of a cover forming an engine room.

6 Claims, 9 Drawing Figures

ENDLESS TRACK TYPE TRACTOR

This invention relates to an endless track type tractor, and more particularly to an endless track type tractor for reducing the forward diffusion of the noise of the engine entrained on a main frame of a tractorbody.

In general, in an endless track type tractor such as, for example, a bulldozer is loaded a radiator, engine and power transmission mechanism on a main frame, which are surrounded by a radiator guard, side cover, bonnet, front undercover, dashboard, rear undercover, floor plate, grill radiator mask, rear cover having an air intake port, etc. in structure. Therefore, when the fan for cooling the radiator provided at the front of the engine is rotated, the air taken in from the air intake port of the rear cover and the gaps of the aforementioned covers cools the radiator, and is then discharged from the grill radiator mask at the front of the radiator at the same time the noise of the engine is also diffused directly in the forward direction of the tractor. For this reason, operators working at the front of the tractor feel uncomfortable and work inefficiently as a result.

This invention contemplates to eliminate the aforementioned disadvantages of the conventional tractor, and has as an object to provide an endless track type tractor which does not directly diffuse the noise of the engine in forward direction of the tractor.

It is an another object of this invention to provide an endless track type tractor which reduces the noise of the engine diffusing out of the tractor body.

The characteristic feature of this invention is an endless track type tractor which comprises a radiator mask projected forwardly at the central portion of one side of a rectangular plate to form a curved edge and having a central recessed portion continued from the curved edge.

Figure 2:
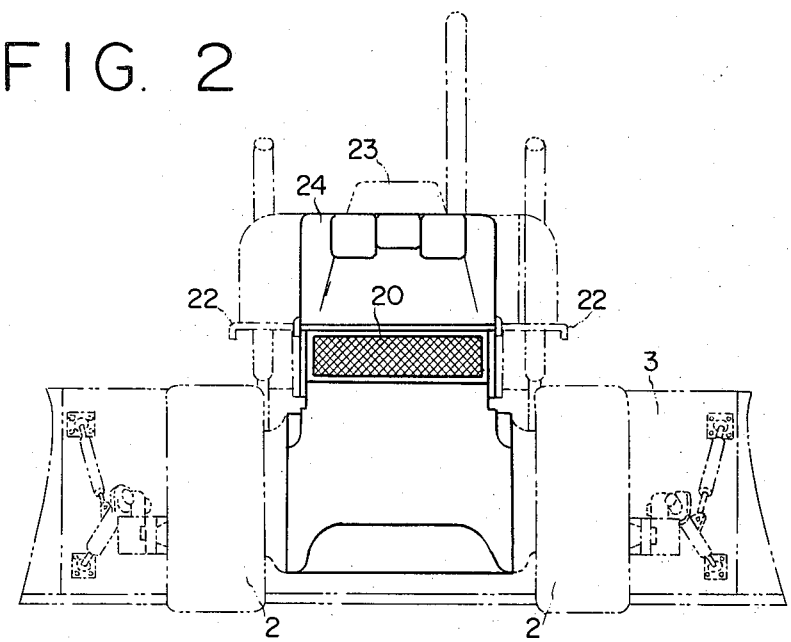
Figure 8:
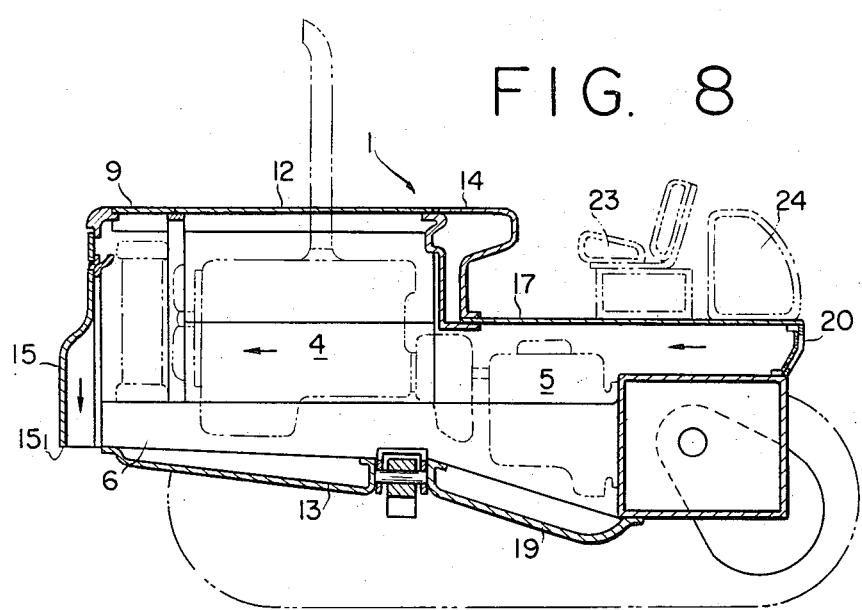
Figure 6:
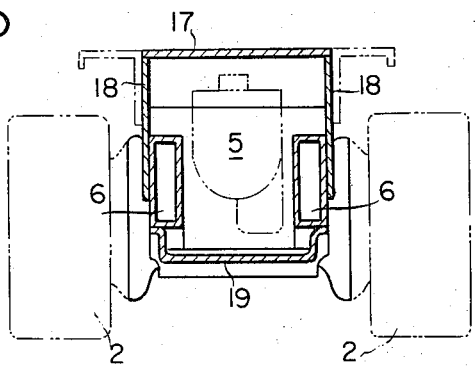
Figure 3:
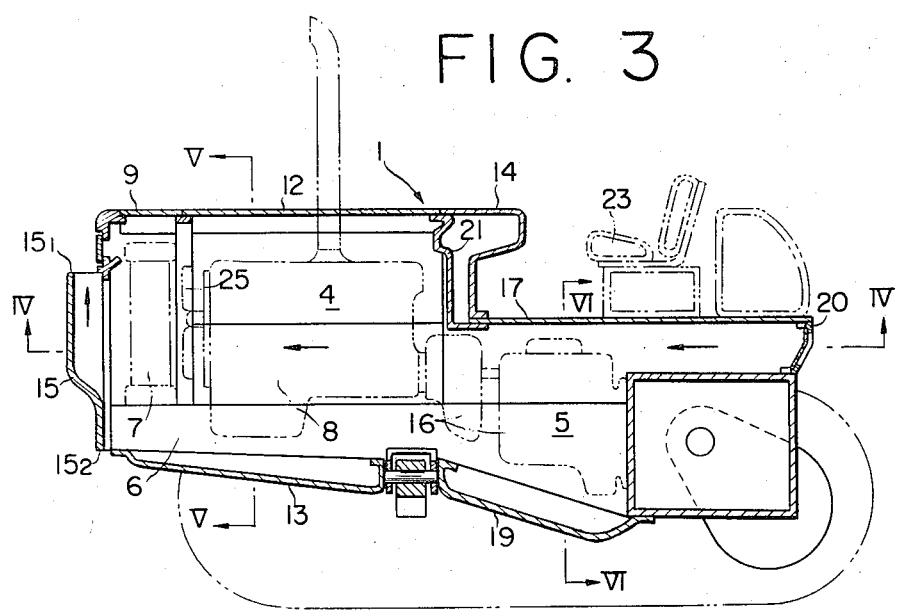
Figure 4:
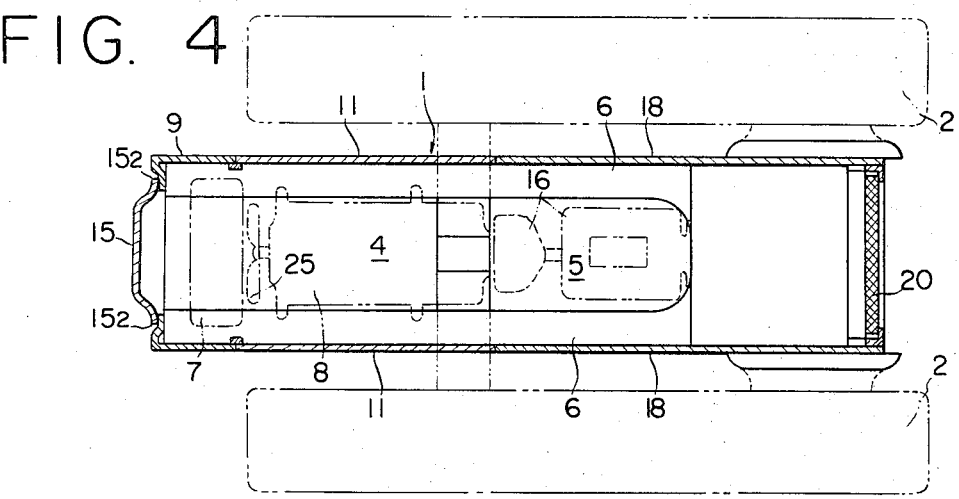
Figure 5:
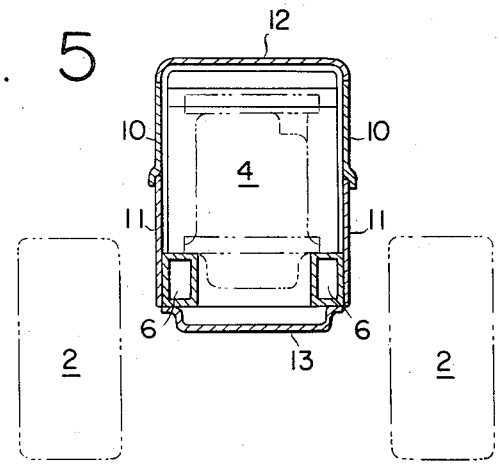
Figure 9:
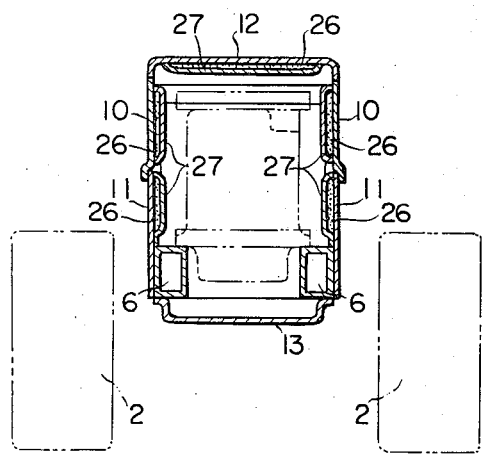
Figure 7:
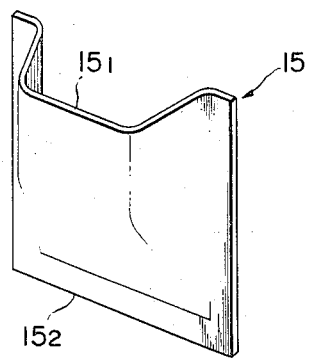

The other objects, features and advantages of the present invention will become apparent from the following description taken in conjunction with the accompanying drawings, in which:

FIG. 1 is a plan view of overall the tractor;
FIG. 2 is a back view of the tractor;
FIG. 3 is sectional view of the tractor along the line III—III in FIG. 1;
FIG. 4 is a sectional view of the tractor along the line IV—IV in FIG. 3;
FIG. 5 is a sectional view of the tractor along the line V—V in FIG. 3;
FIG. 6 is a sectional view of the tractor along the line VI—VI in FIG. 3;
FIG. 7 is a perspective view of the radiator mask of the tractor;
FIG. 8 is a sectional view of another embodiment of the tractor similar to FIG. 3; and
FIG. 9 is a sectional view of another embodiment of the tractor similar to FIG. 5.

Reference is now made to the drawings, particularly to FIGS. 1 to 7, which show one embodiment of the endless track type tractor of this invention.

In FIGS. 1 and 2, which show the plan and back views of the overall endless track type tractor of this invention, at the right, left and front of the body 1 of the tractor are provided endless tracks 2 and a blade 3, respectively shown by virtual lines. As shown in FIGS. 3 to 7, the tractor body 1 has an engine room 4, and a room 5 for containing a power transmission mechanism continuously formed with the engine room 4.

The engine room 4, for containing a radiator 7 and an engine 8 entrained on a main frame 6 shown by virtual line, consists of a radiator guard 9 mounted at the front of the main frame 6, front upper and lower side plates 10, 10, 11 and 11 provided continuously at the rear of the radiator guard 9, a bonnet 12 provided continuously at the rear of the radiator guard 9 and between the front upper side plates 10 and 10, a front undercover 13 underneath the main frame 6, a dashboard 14 continuously provided at the rear of the front upper side plates 10 and 10 and bonnet 12, and a radiator mask 15 projected forwardly at the central portion of one side edge of a rectangular plate to form a curved edge $15_1$ and having a central recessed portion continued from the curved edge $15_1$ and fixed at three side edges $15_2$ except the curved edge $15_1$ to the radiator guard 9 of the characteristic feature of this invention. The room 5 for containing the power transmission mechanism 16 has a floor plate 17 continuously provided at the rear of the rear lower end of the dash board 14, rear side plates 18 continuously provided at the rear of the front lower side plates 11 and 11, a rear undercover 19 mounted underneath the main frame 6, and a rear cover 20 formed in grill shape. As shown in FIG. 3, at the front of the dashboard 14 is mounted a noise shielding plate 21. As shown in FIGS. 2 and 3, at both sides of the floor plate 17 are mounted fenders 22 and 22, and on the floor plate 17 are provided a seat 23 and a tank 24, and at the front of the engine 8 is provided a fan 25 for cooling the radiator known heretofore per se.

In FIG. 3, the tractor has the radiator mask 15 so disposed that the curved edge $15_1$ directs upwardly to be fixed to the radiator guard 9.

Referring now to FIG. 8, which shows another embodiment of the tractor of this invention, the curved edge $15_1$ of the radiator mask 15 is fixed to the radiator guard 9 in such a manner that the edge $15_1$ directs downwardly.

Since the tractor of this invention is thus constructed, when the fan 25 for cooling the radiator is rotated, the air taken in from the rear cover 20 cools the radiator 7, and is then guided toward the radiator mask 15 at the front of the radiator 7 upwardly to be discharged into the atmosphere in case of the tractor shown in FIG. 3 and downwardly to be discharged into the atmosphere in case of the tractor shown in FIG. 8 at the same time the noise of the engine 8 is also guided to the radiator mask 15 then upwardly or downwardly to be diffused into the atmosphere. Thus, the noise of the engine to be transmitted to the operators working at the front of the tractor is lowered or reduced so as to lessen the uncomfortable feeling of the operators and to eliminate the lower operating efficiency of the operators.

Reference is now made to FIG. 9, which shows another embodiment of the tractor of this invention. A sound insulating material 26 is mounted by a cover 27 on the inner surfaces of the front upper and lower side plates 10, 10, 11 and 11 and bonnet 12 so as to absorb the noise of the engine 8 by the sound insulating material 26, and accordingly so as to reduce the noise of the engine 8 diffused around the tractor.

Since the tractor of this invention is thus constructed, not only the noise of the engine is reduced at the front of the tractor, but also the noise of the engine is lowered around the tractor in order to improve the operating efficiency of the operator working around the tractor.

What is claimed is:

1. An endless track-type tractor comprising a main frame, an engine supported by said frame, a radiator disposed forwardly from said engine, first cover means enclosing said engine and said radiator and having a substantially open rectilinear front surface substantially in parallel with said radiator, a power transmission mechanism operatively associated with and disposed rearwardly therefrom, a radiator guard means formed as an extension of said first cover means, second cover means enclosing said power transmission mechanism, a fan for cooling said radiator disposed between said engine and said radiator and adapted to create air flow in the forward direction and a radiator mask providing an egress for the air flow generated by said fan covering said substantially open rectilinear front surface of said first cover means, said radiator mask being fixed at three side edges to said first cover means, with a fourth edge extending forwardly from said first cover means to form an opening communicating with and substantially perpendicular to the opening in said substantially open rectilinear front surface of said first cover means, and wherein said mask is projected forward of said first cover means to form a curved edge and a central recessed portion continuous from said curved edge.

2. An endless track-type tractor according to claim 1 wherein said radiator mask is fixed to the front end of said first cover means such that the communicating opening faces upwardly.

3. An endless track-type tractor according to claim 1 wherein said radiator mask is fixed to the front end of said first cover means such that the communicating opening faces downwardly.

4. An endless track-type tractor according to claim 1 wherein a sound insulating material is mounted on the inner surface of said first cover means.

5. An endless track-type tractor comprising a main frame, an engine supported by said frame, a radiator disposed forwardly from said engine, first cover means enclosing said engine and said radiator and having a substantially open rectilinear front surface substantially in parallel with said radiator, a power transmission mechanism operatively associated with and disposed rearwardly therefrom, second cover means enclosing said power transmission mechanism, a fan for cooling said radiator disposed between said engine and said radiator and adapted to create air flow in the forward direction, a radiator mask providing an egress for the air flow generated by said fan covering said substantially open rectilinear front surface of said first cover means, said radiator mask being fixed at three side edges to said first cover means, with a fourth edge extending forwardly from said first cover means to form an opening communicating with and substantially perpendicular to the opening in said substantially open rectilinear front surface of said first cover means, air inlet means provided in the rear of said second cover means, said first and second cover means forming a continuous air flow chamber for permitting the passage of air in the forward direction.

6. An endless track-type tractor according to claim 5 further comprising a dashboard disposed behind said engine and above said power transmission mechanism, and a noise-shielding plate disposed between said dashboard and said engine.

* * * * *